United States Patent [19]

Land et al.

[11] Patent Number: 4,770,846

[45] Date of Patent: Sep. 13, 1988

[54] REPLACEMENT SUPPORT PIN FOR GUIDE TUBES IN OPERATING PLANTS

[75] Inventors: John T. Land; Ronald J. Hopkins; Jose M. Martinez, all of Pensacola, Fla.

[73] Assignee: Westinghouse Electric Corp., Pittsburgh, Pa.

[21] Appl. No.: 576,645

[22] Filed: Feb. 3, 1984

[51] Int. Cl.$^4$ .................. G21C 19/00; F41B 39/04
[52] U.S. Cl. .................. 376/353; 376/463; 411/201; 411/212; 411/221; 403/259; 29/517
[58] Field of Search ............ 411/333, 334, 335, 336, 411/191, 192, 195, 197, 201, 212, 221, 204; 376/463, 353, 310; 403/406.1, 259; 29/511, 517

[56] References Cited

U.S. PATENT DOCUMENTS

| | | |
|---|---|---|
| 374,274 | 12/1887 | Schapiro . |
| 498,834 | 6/1893 | Woods . |
| 803,310 | 5/1905 | Smith ................................ 411/201 |
| 890,339 | 6/1908 | Cooper . |
| 925,067 | 6/1909 | Zeese . |
| 976,928 | 11/1910 | Salisbury . |
| 1,254,726 | 11/1918 | Portee . |
| 1,272,584 | 7/1918 | Warne . |
| 1,320,962 | 11/1919 | Andrix . |
| 1,363,210 | 12/1920 | Alexander . |
| 1,369,332 | 2/1921 | Elliott ................................ 411/191 |
| 1,410,812 | 3/1922 | Joberty . |
| 1,431,459 | 10/1922 | Hardie . |
| 1,582,094 | 4/1926 | Sweet . |
| 1,595,026 | 8/1926 | Sherman . |
| 2,374,241 | 4/1945 | Simmonds . |
| 2,395,234 | 2/1946 | Schlueter . |
| 3,322,636 | 5/1967 | Benson ........................ 376/310 X |
| 3,997,394 | 12/1976 | Aisch et al. . |
| 4,139,315 | 2/1979 | Levy et al. . |
| 4,166,313 | 9/1979 | Walton . . |
| 4,231,843 | 11/1980 | Myron et al. . |
| 4,323,428 | 4/1982 | Schallenberger et al. ......... 376/353 |
| 4,326,921 | 4/1982 | Cadwell . |
| 4,585,613 | 4/1986 | Styskal et al. ...................... 376/260 |

FOREIGN PATENT DOCUMENTS 130840 1/1985 European Pat. Off. .
2531563 2/1984 France .

OTHER PUBLICATIONS

Nuclear Engineering International, vol. 29, No. 362, Nov. 1984, pp. 29-33.

Primary Examiner—John F. Terapane
Assistant Examiner—John S. Maples
Attorney, Agent, or Firm—L. A. DePaul

[57] ABSTRACT

A support pin system (10) for fastening nuclear reactor guide tube flanges (14) to a nuclear reactor upper core plate (12) includes a support pin (16) having a lower portion (20) frictionally disposed within the upper core plate (12), while an upper section (24) is disposed within a through-bore (22) of the guide tube flange (14). The support pin (16) includes a threaded region (30) upon which is threadedly mounted a nut (32). In order to prevent retrograde rotation of the nut (32) relative to the support pin (16), a locking cap (46) is mounted upon the nut (32) and support pin (16) such that first crimped sections (48) are engaged within apertures (44) defined within the nut (32), while second crimped sections (54) are engaged within longitudinal grooves (50) defined upon the external surface of the support pin (16).

15 Claims, 2 Drawing Sheets

REPLACEMENT SUPPORT PIN FOR GUIDE TUBES IN OPERATING PLANTS

BACKGROUND OF THE INVENTION

1. Field of the Invention

The present invention relates generally to nuclear reactors, and more particularly to a new and improved replacement support pin and locking device system for utilization in connection with nuclear reactor control rod guide tubes within existing operating plants or facilities in order to fixedly secure the control rod guide tubes, by means of their annular flanged portions, to the upper surface of the upper core plate of the reactor by means of a non-welded mechanical system when existing, conventional welded guide tube support pin systems require replacement due to failure, for example, under stress corrosion cracking conditions.

2. Description of the Prior Art

As is well known, within a nuclear reactor, the upper boundary of the reactor core is defined by means of the upper core plate to the undersurface of which the upper ends of the nuclear reactor core fuel assemblies are connected. In addition to the core fuel assemblies being comprised of fuel rods within which the nuclear fuel pellets are disposed, each fuel assembly has defined therein numerous locations within hich nuclear reactor control rods are capable of being disposed for regulating the power output of the fuel assemblies and the reactor core. Control of the power output of the core fuel assemblies is in fact accomplished, for example, by regulating the disposition of the control rods with respect to the core, that is, lowering the same down into the core for decreasing the power output thereof, or elevating the control rods upwardly out of the core so as to permit an increase in the power output of the core. Elevational control of the nuclear reactor control rods is accomplished through means of control rod drive mechanisms (CRDMs) through the intermediary of control rod drive rods which pass vertically upwardly through the nuclear reactor pressure vessel to the uppermost region thereof within which they operatively connect to the control rod drive mechanisms which are actually located exteriorly of the nuclear reactor pressure vessel closure head.

Vertically spaced above the nuclear reactor upper core plate there is disposed the nuclear reactor upper support plate, and between the upper support plate and the upper core plate there is defined the upper plenum chamber through which nuclear reactor core coolant is conducted for subsequent flow through the reactor core coolant loop and heat exchange system which is external of the nuclear reactor pressure vessel and core barrel. In view of the fact that the nuclear reactor control rods may be disposed within the upper plenum chamber when, for example, particular control rods are withdrawn vertically upwardly out of the core, or alternatively, when the control rods are lowered into the core their respective drive rods will be disposed within the upper plenum chamber, protection for the control rods or their drive rods within the upper plenum chamber must be provided with respect to the cross-currents of the flowing nuclear reactor core coolant. Such protection is in fact provided through means of guide or shroud tubes which are interposed between, and fixedly connected to, the upper surface of the upper core plate and the upper support plate.

In particular, in connection with securing the guide tubes to the upper core plate, the guide tubes are provided with annular flanges at the lower ends thereof, and guide tube support pins fixedly interconnect the guide tube flanges to the upper core plate. The vertically disposed guide tube support pins have lower portions which are frictionally engaged within suitable bores defined within the upper core plate, and the upper bolt or stud portion of each guide tube support pin is threadedly engaged with a suitable, internal hexagonal nut, counterbored portions of the guide tube flange being retained between a shoulder portion of the support pin shank and the mated nut. In order to prevent the retrograde rotation of the nut relative to the support pin whereby the nut may possibly become disengaged from the threaded stud portion of the guide tube support pin, a dowel pin is conventionally passed through the nut and welded to a tab which is fixedly secured to the support pin.

While the aforenoted conventional guide tube support pin and locking system thereby fixedly secures the nuclear reactor control rod guide tubes within the upper core plate, stress corrosion cracking problems have been observed to have developed within the support pins leading to failure of the same. Consequently, the support pins require repair or replacement, however, due to the fact that such support pin and locking systems are now disposed within operating plants and are located in an irradiated, underwater environment, remotely controlled welding operations, in order to limit exposure of maintenance personnel to the irradiated environment, are extremely difficult to achieve, particularly in light of the small structural components which comprise the support pin and locking system, and the confined or restricted area within which the welding apparatus would have to be disposed and within which the welding operations would have to be performed and accomplished. In addition, while underwater welding operations per se have of course been capable of being conventionally performed, such conventional apparatus and techniques have only been able to be employed with high radiation dosage to personnel working under requisite remote control constraints. Consequently, in order to in fact be able to achieve such welding operations in connection with the repair or replacement of the failed and cracked guide tube support pin and locking systems, entirely new and technologically sophisticated underwater welding apparatus, including appropriate radiation shielding components, and associated techniques, would have to be developed. Such an undertaking is not deemed economically feasible and cost-effective, and in addition, such technological advances would require considerable time to be developed. A need therefore exists for an entirely different type of guide tube support pin and locking system.

Accordingly, it is an object of the present invention to provide a new and improved nuclear reactor guide tube support pin and locking system.

Another object of the present invention is to provide a new and improved nuclear reactor guide tube support pin and locking system which overcomes the various disadvantages and drawbacks characteristic of conventional guide tube support pin and locking sysems in connection with the installation and removal theroef.

Still another object of the present invention is to provide a new and improved nuclear reactor guide tube support pin and locking system which can effectively secure a nuclear reactor guide tube within the upper core plate and prevent disengagement therefrom by preventing retrograde rotation of the threaded locking nut by means of a non-welded locking system.

Yet another object of the present invention is to provide a new and improved nuclear reactor guide tube support pin and locking system which can effectively secure a nuclear reactor guide tube within the nuclear reactor upper core plate and prevent disengagement therefrom by preventing retrograde rotation of the threaded locking nut relative to the guide tube support pin by means of a simplified dual-crimp locking system.

Still yet another object of the present invention is to provide a new and improved nuclear reactor guide tube support pin and locking system which can effectively secure a nuclear reactor guide tube within the nuclear reactor upper core plate and prevent disengagement therefrom by preventing retrograde rotation of the threaded locking nut relative to the guide tube support pin by means of a simplified dual-crimp locking system which can be remotely implemented.

Yet still another object of the present invention is to provide a new and improved nuclear reactor guide tube support pin and locking system which can effectively secure a nuclear reactor guide tube within the nuclear reactor upper core plate and prevent disengagement therefrom by preventing retrograde rotation of the threaded locking nut relative to the guide tube support pin by means of a simplified dual-crimp locking cap system which can be remotely installed or removed.

A further object of the present invention is to provide a new and improved nuclear reactor guide tube support pin and locking system which can effectively secure a nuclear reactor guide tube within the nuclear reactor upper core plate and prevent disengagement therefrom by preventing retrograde rotation of the threaded locking nut relative to the guide tube support pin by means of a simplified dual-crimp locking cap system which can be remotely controlled within its underwater environment.

A yet further object of the present invention is to provide a new and improved nuclear reactor guide tube support pin and locking system which can effectively secure a nuclear reactor guide tube within the nuclear reactor upper core plate and prevent disengagement therefrom by preventing retrograde rotation of the threaded locking nut relative to the guide tube support pin by means of a simplified dual-crimp locking cap system which is extremely cost-effective to manufacture and to install or remove.

A still further object of the present invention is to provide a new and improved nuclear reactor guide tube support pin and locking system which can effectively secure a nuclear reactor guide tube within the nuclear reactor upper core plate and prevent disengagement therefrom by preventing retrograde rotation of the threaded locking nut relative to the guide tube support pin by means of a simplified dual-crimp locking cap system which can be remotely controlled within confined or restricted spacial environments.

SUMMARY OF THE INVENTION

The foregoing and other objectives are achieved in accordance with the present invention through the provision of a new and improved replacement support pin and locking system for securing nuclear reactor control rod guide tubes within the upper surface of the nuclear reactor upper core plate when existing, conventional welded guide tube support pin systems within existing operating plants or facilities under construction structure equire replacement due t failure under, or example, stress corrosion cracking conditions, wherein the support pin and locking system comprises an upstanding support pin having a split-leaf lower end or base section frictionally engaged within a bore defined within the upper surface of the upper core plate. An intermediate shank portion has an annular shoulder portion integrally formed at the lower end thereof which is adapted to be seated within a counterbored or recessed portion defined within the lower surface of each guide tube flange. The flange is also provided with a through-bore which is co-axially or concentrically defined with respect to the counterbored section within the lower portion thereof, and an upper, externally threaded stud portion of the support pin passes through the guide tube flange through-bore.

Each guide tube flange is likewise provided with a second counterbored or recessed portion which is defined within the upper surface thereof so as to be co-axially or concentrically disposed with respect to the flange through-bore and the first counterbored portion. A vertically disposed, elongated nut is threadedly engaged with the externally threaded stud portion of the support pin, and the lower end of the nut is disposed or seated within the upper, second counterbored section of the guide tube flange. Threaded rotation of the nut upon the support pin is effected by means of a splined tool engaging external splines defined upon the upper outer periphery of the nut, and in order to insure the fact that, once the nut is fully threadedly engaged upon the support pin under predetermined torque load conditions, retrograde rotation of the nut relative to the support pin cannot be experienced such that disengagement between the nut and support pin cannot be inadvertently achieved, a locking cap fixedly interconnects the nut and support pin. In particular, a plurality of holes are provided in a pre-drilled manner within the upper external peripheral sidewall portion of the elongated nut, and a stepped cap has its lower skirt portion crimped into four of the holes defined within the elongated nut such that crimped connections are now defined between the cap and the nut at 90° circumferentially spaced locations. The cap is provided with a central through-bore for accommodating the upstanding projecting portion of the support pin, and this projecting portion of the support pin has four longitudinally or axially extending grooves defined upo its external surface. The external grooves defined within the support pin are arranged at 90° intervals about the support pin axis, and the upstanding portion of the cap is then crimped, at diametrically opposite areas thereof into two of the four support pin grooves thereby defining crimped connections between the support pin and the crimped cap. In this manner, through means of the intermediary crimped cap, relative rotation of the elongated locking nut with respect to the support pin is effectively prevented.

BRIEF DESCRIPTION OF THE DRAWINGS

Various other objects, features, and attendant advantages of the present invention will be more fully appreciated as the same becomes better understood from the following detailed description when considered in connection with the accompanying drawing, wherein.

DESCRIPTION OF THE PREFERRED EMBODIMENT

Figure 1:
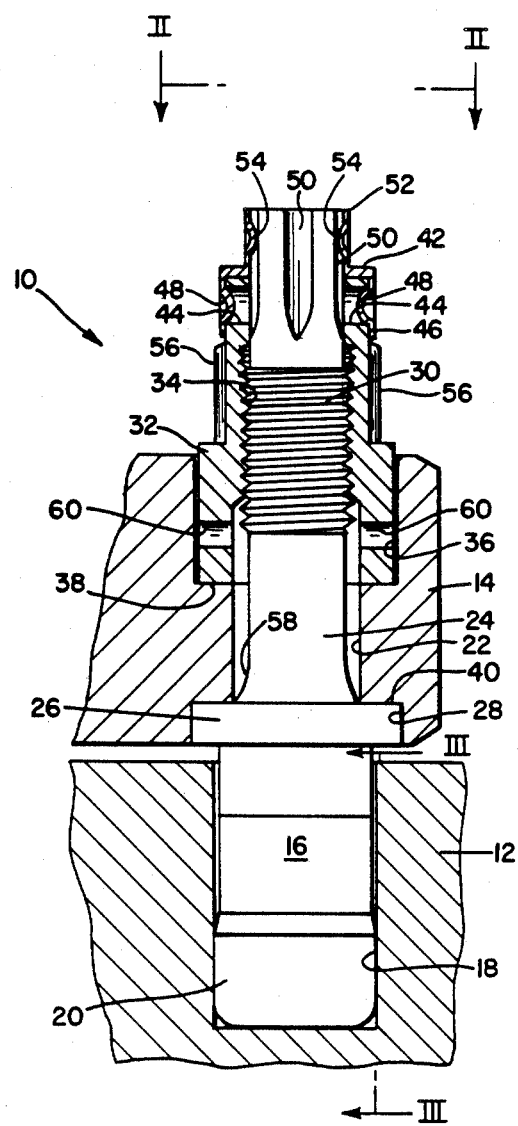
FIG. 1 is a vertical cross-sectional view of the new and improved replacement support pin and locking nut-cap system constructed in accordance with the present invention and showing the cooperative parts
Figure 2:
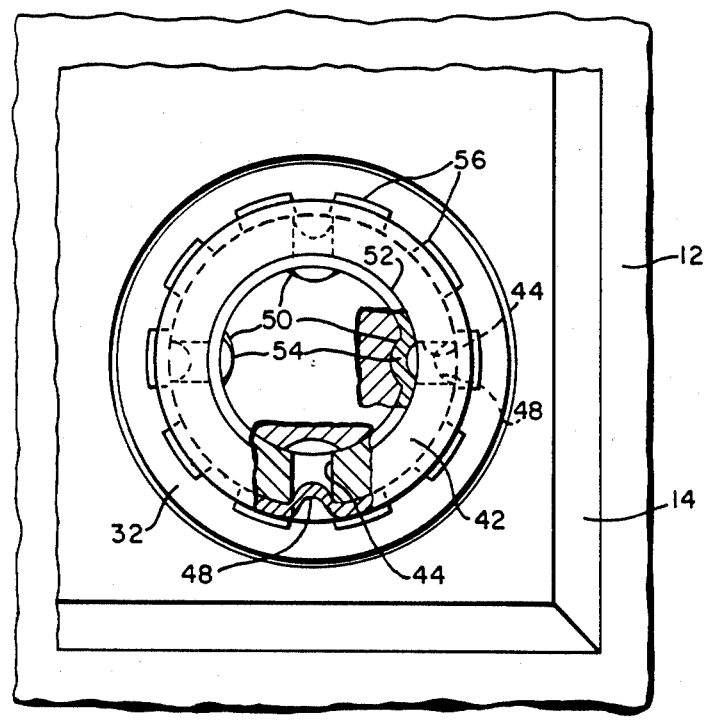
FIG. 2 is a view along line II—II of FIG. 1.
Figure 3:
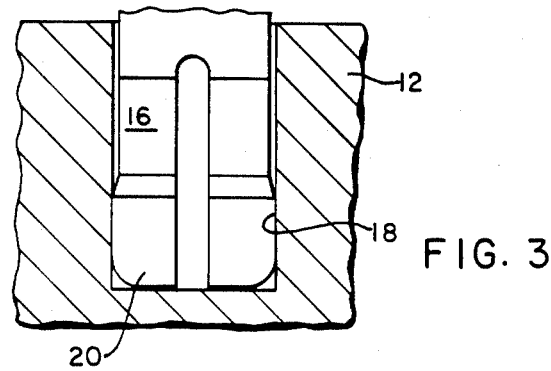
FIG. 3 is a view along line III—III of FIG. 1.

Referring now to the drawing, there is shown in THE SOLE FIGURE thereof the new and improved replacement support pin and locking nut-cap system constructed in accordance with the present invention, as generally indicated by the reference character 10, and showing the cooperative parts thereof for use within existing operating nuclear reactor power plants or facilities for securing nuclear reactor control rod guide tubes to the nuclear reactor upper core plate 12 when existing, conventional welded guide tube support pin systems require replacement due to failure under, for example, stress corrosion cracking conditions. The nuclear reactor control rod guide tubes are secured to the nuclear reactor upper core plate 12 through means of radially outwardly projecting annular flanged portions 14 formed about the lower periphery of each guide tube, and in order to actually interconnect the guide tube flanged portion 14 to the upper core plate 12, a plurality of vertically disposed support pins 16 are utilized, only one such pin 16 being shown, it nevertheless being understood that the pins 16 are disposed in a circumferential array within the annular guide tube flanged portion 14.

In order to accommodate the disposition of the support pins 16, the upper surface of the upper core plate 12 is provided, at each locus of a support pin 16, with a blind bore 18 within which the lower, split-leaf base section 20 of the support pin 16 is adapted to be frictionally inserted and retained. The guide tube flange 14 is provided, at each locus of a support pin 16, with a through-bore 22 for accommodating the intermediate shank portion 24 of the support pin 16, and it is further seen that the shank portion 24 and base section 20 of support pin 16 are integrally connected together by means of an annularly flanged shoulder portion 26. A counterbored or recessed portion 28 is defined within the lower surface of the guide tube flange 14 so as to be co-axially or concentrically disposed with respect to the guide tube through-bore 22, and in this manner, the support pin shoulder portion 26 is appropriately accommodated and seated within the lower surface of the guide tube flange 14.

An upper, externally threaded bolt or stud portion 30 projects vertically upwardly and axially outwardly from the guide tube flange through-bore 22, and is adapted to be threadedly mated with an annular, axially elongated, internally threaded nut 32, the threaded section thereof being disclosed at 34. The nut 32 will of course serve to fixedly retain the guide tube flange 14 in its mounted mode upon each support pin 16, and therefore fixedly secure the nuclear reactor control rod guide tube upon the upper core plate 12. In order to therefore properly accommodate the securing nut 32 upon the threaded stud portion 30 of support pin 16, the upper surface or portion of guide tube flange 14 is provided, at each location of a support pin 16, with a second counterbored or recessed portion 36 which is co-axially or concentrically defined with respect to through-bore 22 and the lower or first counterbore 28. An annular floor surface 38 is thus defined within the guide tube flange 14 upon which the lower annular face of securing nut 32 is engaged and seated in a manner similar to the engagement and seating of the support pin shoulder portion 26 upon the annular ceiling surface 40 of guide tube flange counterbore 28. In this manner, when the securing nut 32 is threadedly engaged upon the externally threaded stud portion 30 of the support pin 16, the guide tube flange 14 will be securely retained between the securing nut 32 and the support pin 16 by means of the engaged seating of the lower end of the nut 32 upon the annular floor surface 38 of flange 14, as well as by means of the engaged seating of the support pin shoulder portion 26 upon the annular ceiling surface 40 of the guide tube flange 14.

Once the securing nut 32 has been threadedly engaged upon the stud portion 30 of the support pin 16, and appropriately torqued to the predetermined load limit or value, it is of course desired to insure the fact that the pin and nut assembly remains intact in their assembled state so as to, in turn, insure the fact that the guide tube flange 14, and therefore the nuclear reactor control rod guide tube, remains positionally fixed with respect to the nuclear reactor upper core plate 12. To accomplish this goal, conventional support pin and securing nut assemblies have had associated therewith a dowel pin which was inserted through an aperture defined within the nut, and wherein the opposite exposed ends of the dowel pin were subsequently welded to a support pin locking tab. In this manner, retrograde rotation of the securing nut relative to the support pin was positively and effectively prevented. This type of locking system, as may readily be appreciated, is of course entirely satisfactory when the various components of the nuclear reactor system are initially installed prior to initiation or commencement of plant operations. However, once plant or facility operations have in fact been commenced, and the support pins require repair or replacement due, for example, to failures as a result of stress corrosion cracking problems, the afore-noted welded-type dowel pin locking system cannot be simply effectuated in view of the fact that such welding operations must now be performed remotely, in order to protect maintenance personnel from radiation exposure within the irradiated environment, and the operations must also be performed in a spacially restricted or confined underwater environment. While underwater welding operations, per se, have of course already been conventionally achieved, entirely new and technologically sophisticated equipment and techniques would have to be developed in order to achieve the welded replacement of existing welded nuclear reactor control rod guide tube support pin systems. In lieu thereof, the present invention provides an entirely new and different type of securement system for preventing retrograde rotational movement of the securing nut 32 relative to the support pin 16.

In accodance with the present invention, a stepped cap 42 is adapted to be operationally interfaced between the support pin 16 and the securing nut 32 so as to fixedly interconnect the securing nut 32 with the support pin 16 and thereby prevent retrograde rotation of the nut 32 relative to pin 16 whereby inadvertent disengagement or separation of such two components is effectively prevented. In particular, a circumferential array of apertures 44 are provided within the upper end of nut 32, and the cap 42 is seen to comprise a dependent peripheral skirt portion 46. Accordingly, four, equiangularly spaced crimped sections 48 of the cap skirt portion 46 may be formed at 90° intervals about the cap axis so as to be operatively engaged within four of the nut apertures 44, respectively. This crimping operation may be performed at a location remote from the installation site within the nuclear reactor such that when the nut 32 is to be threadedly assembled upon the support pin 16, the nut 32 and crimped cap 42 are threadedly installed upon the support pin 16 as a pre-assembled unit.

Continuing further, it is also seen that the uppermost end of the support pin 16 above the threaded portion 30 thereof is provided with longitudinally or axially extending grooves 50 which are equiangularly spaced about the support pin 16 at 90° intervals. The cap 42 includes an upstanding tubular portion 52 through which the upper end of the support pin 16 passes, and once the securing nut-crimped cap assemblage 32-42 is fully threadedly engaged upon the support pin 16 by means of interengagement with the support pin threaded section 30, and the predetermined torque load value or limit has been attained, then diametrically opposed crimped sections of the crimped cap upstanding tubular portion 52 may be formed, as shown at 54, so as to operatively engage two diametrically opposed grooves 50 formed upon the upper end of support pin 16. This crimping operation must of course be performed, contrary to the crimping operations in connection with crimped connections 48, in situ at the locations sites of the support pins 16. In view of such requirements, these crimping operations will be performed by means of suitable, remotely controlled tools, not shown, whereby such crimping operations may in fact be performed in the irradiated underwater environment without exposing maintenance personnel to the irradiated environment.

It is to be noted at this juncture that within the conventional support pin, securing nut, and welded locking dowel pin system, the upper projecting longitudinally grooved section of the support pin 16 was not of course a component part of the aforenoted conventional system, and similarly, the crimped cap 42 was likewise not incorporated within the conventional system. As a result of the absence of these components which are now critically integral components of the system of the present invention, the conventional securing nut threadedly engaged upon the support pin was provided with an internal hexagonal socket by means of which a suitable hexagonal wrench was able to be employed for imparting rotation to the securing nut in order to in fact threadedly engage the same upon the support pin. As a result of the development and implementation of the presently invented nuclear reactor control rod guide tube support pin, securing nut, and crimped cap locking system 10, particularly in view of the upwardly extending and projecting grooved portion of the support pin 16 relative to the securing nut 32, as well as the particular disposition of the crimped locking cap 42 upon the securing nut 32 and its engagement with the support pin 16, spacial restrictions did not permit the utilization of an internal hexagonal securing nut, and in addition, accessibility thereto would be entirely prevented. Consequently, it was envisioned to employ an external hexagonal securing nut to facilitate threaded rotation of the same relative to the support pin 16, however, again, spacial restrictions and confines militated against the employment of such a securing nut. In particular, a suitable hexagonal torque wrench could not be positioned about the external hexagonal nut structure in an annular, 360° mode so as to impart the necessary torque to the securing nut. Accordingly, pursuant to the present invention, the securing nut 32 is provided with ten, vertically oriented splines 56 defined within the external surface thereof in a circumferential array. In this manner, a suitable splined torque tool, not shown, can axially engage the securing nut splines 56, and once engaged, rotational torque applied thereto. Due to the aforenoted spacial constraints and restrictions, the splined torquing tool need not engage the securing nut 32 in a complete 360° annular relationship as would be true of a conventional external hexagonal torque wrench. In particular, the external splined torque wrench may engage the securing nut splines 56 over a circumferentially extending arcuate area of less than 180°, and the splined torque wrench stroke may be, for example, 36°.

Once the new and improved replacement support pin-securing nut-crimped locking cap assembly or system 16-32-42 of the present invention has been installed within the nuclear reactor control rod guide tube flange 14 and upper core plate 12 components, it is of course highly desirable to maintain the entire assembly or system 10 of the present invention free from the effects of stress corrosion cracking failures or problems such that further replacement of the support pins 16, for example, need not be undertaken. Accordingly, it has been determined, among other factors affecting the support pins 16 per se, that the particular torque load or limit impressed thereon will be somewhat reduced, and in addition, the fabrication techniques in connection with the split-leaf base section 20 of the support pin 16 will be accordingly modified. Both of these modifications will substantially affect the annular shoulder portion 26 of the support pin shank 24 wherein numerous conventional stress corrosion cracking problems and failures had been observed. Still further, the radiused curvature of the annular transition section 58 defined between the support pin shank portion 24 and the annular shoulder portion 26 has been modified, and the heat treatment processing of the entire support pin 16 has been accordingly altered so as to alleviate the tendency for stress corrosion cracking to develop. These various modifications do not, however, form a part of the present invention, and consequently, the details of such modifications have not been disclosed herein. To the contrary, the sole purpose of disclosing the existence of such structural and fabrication modifications which do not form a part of the present invention has been to simply render the new and improved replacement support pin-securing nut-crimped locking cap system or assembly 10 of the present invention more viable and operative over extended periods of service life once the new and improved system or assembly 10 has in fact been installed, as opposed to the simple disclosure of the installation of an allegedly new and improved replacement support pin system which would otherwise prove to be serviceably defective within a relatively short period of time had not the aforenoted structural and fabrication modifications, which do not form a part of the present invention, at least been contemplated and effectuated in connection with the installation of the new and improved replacement support pin system 10 of the present invention.

In accordance with the present invention, however, a substantial structural modification has in fact been made to the securing nut 32 in order to eliminate the tendency of the support pin 16 to experience corrosion crevice cracking as a result of the accumulation or collection of contaminants and debris within the relatively stagnant through-bore region of the nut 32 which annularly surrounds the support pin shank portion 24. Such a structural modification is embodied within a plurality of radially extending flow holes or apertures 60 defined within the lower end of the securing nut 32 which therefore now fluidically communicate with the annular through-bore region of the nut 32 surrounding the support pin shank portion 24. The contaminants and debris which therefore tend to collect within such region ar fluidically flushed out from the region whereby the heretofore stagnant collection of such contaminants and debris is eliminated.

Obviously, many modifications and variations of the present invention are possible in light of the above teachings. It is therefore to be understood that within the scope of the appended claims, the present invention may be practiced otherwise than as specifically described herein.

We claim:

1. A support pin system for fastening a first member to a second member, comprising:
   a support pin;
   a through-bore defined within said first member;
   a first portion of said support pin fixedly secured within said second member;
   a second portion of said support pin disposed within and passing through said through-bore of said first member;
   a threaded region provided upon said second portion of said support pin;
   a nut threadedly engaged with said threaded region of said support pin and operatively cooperating with said support pin for retaining said first member between said nut and said support pin; and
   a tubular cap having first crimped means operatively engaging said nut, and second crimped means operatively engaging said support pin, whereby relative rotation between said nut and said support pin is positively prevented by said tubular cap when said first and second crimped means respectivley engage said nut and support pin.

2. The support pin system as set forth in claim 1 wherein said nut has a plurality of flow apertures formed therein so as to premit coolant to flow therethrough.

3. A support pin system as set forth in claim 1, wherein:
   said locking cap and said nut comprise pre-assembled crimped means for subsequently crimpingly engaging said support pin.

4. A support pin system as set forth in claim 1, wherein:
   said tubular cap has a stepped configuration.

5. A support pin system as set forth in claim 4, wherein said stepped locking cap comprises:
   a dependent skirt portion operatively engaged with said nut; and
   an upstanding tubular portion operatively engaged with said support pin.

6. A support pin system for fastening a nuclear reactor control rod guide tube flange to a nuclear reactor upper core plate, comprising:
   a support pin;
   a through-bore defined within said guide tube flange;
   a split-leaf first portion of said support pin frictionally engaged within said plate;
   a second portion of said support pin disposed within and passing through said through-bore of said guide tube flange;
   a threaded region provided upon said second portion of said support pin;
   an annular shoulder portion defined between said first portion of said support pin and said second portion of said support pin;
   first counterbore means defined within the lower surface of said guide tube flange within which said annular shoulder portion of said support pin is seated;
   a nut having a plurality of circumferentially defined holes for engagement and having spline means defined upon the external periphery thereof for enabling rotation of said nut relative to said support pin and threadedly engaged with said threaded region of said support pin and operatively cooperating with said support pin for retaining said guide tube flange between said nut and said support pin;
   second counterbore means defined within the upper surface of said guide tube flange within which said nut is seated; and
   locking locking cap means having first crimped means operatively engaging said holes, and second crimped means operatively engaging said support pin, whereby relative rotation between said nut and said support pin is positively prevented by said locking means when said first and second crimped means respectively engage said nut and support pin.

7. A support pin system for fastening a nuclear reactor control rod guide tube flange to a nuclear reactor upper core plate in an irradiated, underwater environment, comprising:
   a support pin;
   a through-bore defined within said guide tube flange;
   a lower portion of said support pin fixedly secured within said upper core plate;
   an upper portion of said support pin disposed within and passing through said through-bore of said guide tube flange;
   a threaded region provided upon said upper portion of said support pin;
   a nut threadedly engaged with said threaded region of said support pin and operatively cooperating with said support pin for retaining said guide tube flange between said nut and said support pin;
   a plurality of holes defined within said nut;
   a plurality of grooved defined within said support pin; and
   a locking cap dispoed externally about said nut and said support pin and having first crimped means for operatively engaging said plurality of holes defined within said nut, and second crimped means for operatively engaging said plurality of grooves defined within said support pin, whereby relative rotation between said nut and said support pin is positively prevented by said locking cap when said first and second crimped means respectively engage said nut and said support pin.

8. A support pin system as set forth in claim 7, further comprising:
   spline means defined upon the external surface of said nut for facilitating rotation of said nut relative to said support pin.

9. A support pin system for fastening a first member to a second member, comprising:

a support pin passing through and projecting beyond said first member, and fixedly secured within said second member;

threaded means provided upon said support pin;

nut means having transversely defined apertures therethrough for permitting coolant to flow through said support pin system so as to prevent stagnation of said coolant within said support pin system for threadedly engaging said support pin threaded means for securing said first member between said support pin and said nut means; and a locking cap crimpingly engaged with both said nut means and said support pin for preventing relative rotation of said nut means with respect to said support pin and wherein said apertures in said nut means are devoid of any portion of said locking cap.

10. A support pin system as set forth in claim 9, wherein:

said nut means is externally splined for facilitatrotation thereof relative to said support pin.

11. A support pin assembly adapted to be fastened to nuclear reactor control rod guide tube flanges having passages with said passages having a wall and with counterbores each of a predetermined diameter and adapted to receiver a portion of said support pin, said support pin having an intermediate shoulder adapted to be fittingly received in said counterbore for engagement with said guide tube flange, a base section extending axially from said shoulder and adapted to be received in a bore in a member on which said guide tube flange is to be disposed, a stressable shank extending from said shoulder in an axial direction opposite said base section and adapted to be received in one of said guide tube flange passages, said shank having a diameter smaller than that of said passages such that an annular flange space is formed between said shank and said guide tube flange passage wall, said support pin having a threaded stud portion adapted to receive a nut for mounting said support pin on said guide tube flange, said nut having an axially projecting skirt with an inner diameter larger than the diameter of said shank such that an annular nut space is formed between said skirt and said shank which annular nut space is in open communication with the annular flange space when said support pin is installed and said skirt is seated on said guide tube flange and with flow apertures formed in said skirt so as to permit coolant to flow through said annular nut space around said shank within said flange.

12. The assembly according to claim 11 wherein said flow apertures are arranged opposite one another.

13. A support pin for fastening a first member to a second member, comprising:

a support pin;

a through-bore defined within said first member;

a first portion of said support pin fixedly secured within said second member;

a second portion of said support pin disposed within and passing through said through-bore of said first member;

a threaded region provided upon said second portion of said support pin;

groove means defined in a circumferential array and vertically disposed completely above said threaded region of said support pin;

a nut threadedly engaged with said threaded region of said support pin and operatively cooperating with said support pin for retaining said first member between said nut and said support pin; and tubular locking cap means having first crimped means operatively engaging said nut, and second crimped means operatively engaging said groove means, whereby relative rotation between said nut and said support pin is positively prevented by said locking means when said first and second crimped means respectively engage said nut and said groove means.

14. A support pin system as set forth in claim 13, wherein:

said groove means extend longitudinally of said support pin.

15. A support pin system for fastening a nuclear reactor control rod guide tube flange to a nuclear reactor upper core plate, comprising:

a support pin;

a through-bore defined within said guide tube flange;

a first portion of said support pin fixedly secured within said plate;

a second portion of said support pin disposed within and passing through said through-bore of said guide tube flange;

a threaded region provided upon said second portion of said support pin;

a nut having transversely defined apertures therethrough for permitting coolant fluid with the nuclear reactor to flow through said support pin system so as to prevent stagnation of said coolant fluid within said support pin system and threadedly engaged with said threaded region of said support pin and operatively cooperating with said support pin for retaining said first member between said nut and said support pin; and locking means having first crimped means operatively engaging said nut, and second crimped means operatively engaging said support pin, whereby relative rotation between said nut and said support pin is positively prevented by said locking means when said first and second crimped means respectively engage said nut and support pin and wherein said apertures in said nut means are devoid of any portion of said locking means.

* * * * *